United States Patent [19]

Hirsch

[11] 3,875,377

[45] Apr. 1, 1975

[54] NOISE GENERATOR

[75] Inventor: Jean-Jacques Hirsch, Echirolles, France

[73] Assignee: Societe Generale De Constructions Electriques et Mechaniques (Alsthom), Paris, France

[22] Filed: Dec. 29, 1972

[21] Appl. No.: 319,238

[52] U.S. Cl....... 235/92 LG, 235/92 DE, 235/92 R, 328/45, 331/78

[51] Int. Cl............................................ H03k 21/10

[58] Field of Search...... 235/92 LG, 92 BD, 92 DE, 235/152; 328/45; 331/78; 307/226 R

[56] References Cited

UNITED STATES PATENTS 3,544,773 12/1970 Peddie........................... 235/92 LG 3,568,070 3/1971 Kaps et al............................ 328/45

*Primary Examiner*—Gareth D. Shaw
*Assistant Examiner*—Joseph M. Thesz, Jr.
*Attorney, Agent, or Firm*—Craig & Antonelli

[57] ABSTRACT

The invention concerns a noise generator, more particularly for the conversion of a digital signal into a stochastic representation. It is characterized in that the noise generator, constituted by a decimal counter coded in binary code, makes the sequence: 5, 2, 7, 1, 8, 3, 6, 0, 9, 4 appear for each decade. This noise generator is applied in calculators and in digital-to-analog/analog-to-digital converters.

4 Claims, 2 Drawing Figures

FIG.2

NOISE GENERATOR

The invention concerns a digital noise generator which may be used more particularly for converting a digital signal into a stochastic representation. Such a conversion may be applied in the signal converter for converting from the digital form to the analog form and vice versa, with an intermediate stochastic representation, already proposed by the applicant, and in various calculators using stochastic representation.

A conversion of a digital signal into a stochastic representation may be effected by means of a logic comparator which receives at the input, the digital signal to be converted and a signal emitted by a noise generator and which gives, at the output, a comparison signal forming a stochastic representation.

The invention has, more particularly, for its object a noise generator constituted by a binary coded decimal (BCD) counter which comprises as many stages each making the values from 0 to 9 appear as there are decades of the noise to be produced, in which the stages of the decade whose weighting is the heaviest receives clock pulses and in which each of the other stages receives, from the preceding stage, corresponding to the decade whose weighting is immediately greater, a signal whose frequency is 10 times smaller than the frequency of the signal received by that preceding stage, and it is characterized in that each stage is constituted so as to make successive values appear in the order: 5, 2, 7, 1, 8, 3, 6, 0, 9, 4.

It has indeed been observed that such a sequence makes it possible to divide by two the operation time in relation to that which is necessary with an analog noise generator, but in which the values of a decade appear in the natural order.

Figure 1:
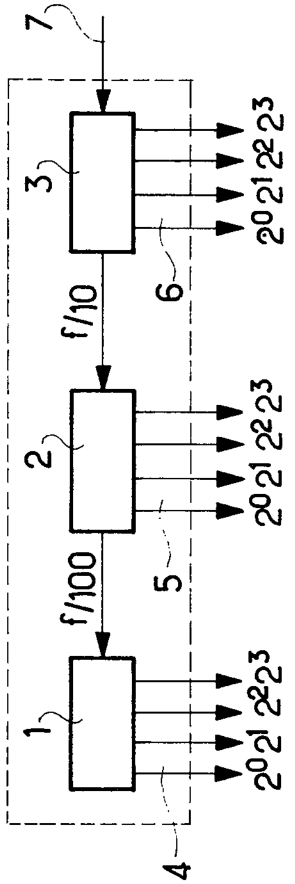
Figure 2:
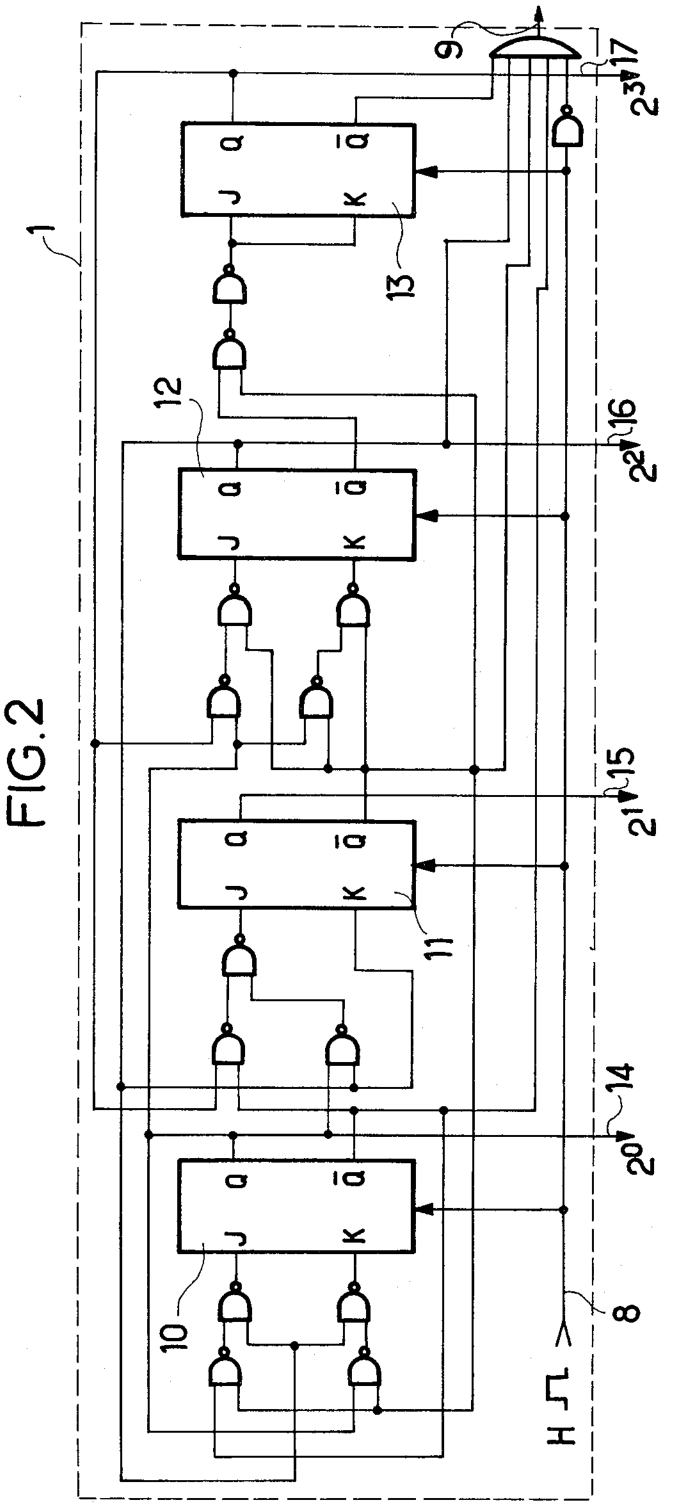

An example of the implementing of the invention will be described with reference to the accompanying diagrammatic figures, wherein:

FIG. 1 is a schematic block diagram of a noise generator with three decades; and FIG. 2 is a circuit diagram of one of the stages of the noise generator of FIG. 1.

In FIG. 1, a noise generator is composed of three stages 1, 22, and 3 of a BCD counter, corresponding respectively to decades of increasing weighting and producing, on each of the outputs 4, 5, and 6, values which may vary from 0 to 9, in binary code. Clock pulses having a frequency of *f* are applied at input 7 in stage 3, whose weighting is the highest, and which transmits to the following stage 2 a signal whose frequency is *f*/10. In its turn, the stage 2 transmits to the stage 1 a signal whose frequency is *f*/100.

FIG. 2 represents one of the stages 1, 2, and 3 which receives clock pulses at 8 and transmits them at 9 to the stage whose weighting is immediately below. That stage is composed of four J-K flip-flops 10, 11, 12, and 13, and of "NAND" logic operators with interconnections as shown such that values comprised between 0 and 9 are obtained by means of the binary outputs 14, 15, 16, and 17 in the following order: 5, 2, 7, 1, 8, 3, 6, 0, 9, 4.

What is claimed is:

1. A noise generator more particularly for the conversion of a digital signal into a stochastic representation comprising a binary coded decimal counter including as many stages in series producing the values from 0 to 9 in binary form as there are decades of the noise to be produced, input means for applying clock pulses to the stage of the counter whose weighting is the heaviest and in which each of the other stages receives, from the preceding stage, corresponding to the decade whose weighting is immediately greater, a signal whose frequency is ten times smaller than the frequency of the signal received by that preceding stage, each stage of said counter including gating means for producing successive values in the order: 5, 2, 7, 1, 8, 3, 6, 0, 9, 4 to appear at the outputs thereof, wherein each stage of said counter includes first, second, third, and fourth J-K flip-flops, said gating means including a first NAND gate having one input connected to the reset output of said first flip-flop, and a second input connected to the reset output of said second flip-flop, a second NAND gate having one input connected to the output of said first NAND gate and a second input connected to the set output of said third flip-flop, the output of said second NAND gate being connected to the J input of said first flip-flop, a third NAND gate having one input connected to the set output of said first flip-flop and a second input connected to the reset output of said second flip-flop, and a fourth NAND gate having one input connected to the output of said third NAND gate and a second input connected to the set output of said third flip-flop, the output of said fourth NAND gate being connected to the K input of said first flip-flop.

2. A noise generator as defined in claim 1 wherein said gating means further includes a fifth NAND gate having one input connected to the set output of said fourth flip-flop and a second input connected to the reset output of said first flip-flop, a sixth NAND gate having one input connected to the set output of said first flip-flop and a second input connected to the set output of said third flip-flop, and a seventh NAND gate having respective inputs connected to the outputs of said fifth and sixth NAND gates, respectively, the output of said seventh NAND gate being connected to the J input of said second flip-flop, the K input of said second flip-flop being connected to the set output of said third flip-flop.

3. A noise generator as defined in claim 2 wherein said gating means further includes an eighth NAND gate having one input connected to the set output of said fourth flip-flop and a second input connected to the set output of said first flip-flop, a ninth NAND gate having one input connected to the output of said eighth NAND gate and a second input connected to the reset output of said second flip-flop, a tenth NAND gate having one input connected to the set output of said first flip-flop and a second input connected to the reset output of said second flip-flop, and an eleventh NAND gate having one input connected to the output of said tenth NAND gate and a second input connected to the reset output of said second flip-flop, the J input of said third flip-flop being connected to the output of said ninth NAND gate and the K input thereof being connected to the output of said eleventh NAND gate.

4. A noise generator as defined in claim 3 wherein said gating means further includes a twelfth NAND gate having one input connected to the reset output of said third flip-flop and a second input connected to the reset output of said second flip-flop, and a thirteenth NAND gate connected between the output of said twelfth NAND gate and the J input of said fourth flip-flop, to which the K input there of is also connected.

* * * * *